United States Patent
Hikida

(10) Patent No.: US 10,110,798 B2
(45) Date of Patent: Oct. 23, 2018

(54) APPARATUS FOR AND METHOD OF OBSERVING CELLS

(71) Applicant: SCREEN HOLDINGS CO., LTD., Kyoto (JP)

(72) Inventor: Yuichiro Hikida, Kyoto (JP)

(73) Assignee: Screen Holdings Co., Ltd., Kyoto (JP)

( * ) Notice: Subject to any disclaimer, the term of this patent is extended or adjusted under 35 U.S.C. 154(b) by 134 days.

(21) Appl. No.: 15/251,550

(22) Filed: Aug. 30, 2016

(65) Prior Publication Data

US 2017/0237894 A1 Aug. 17, 2017

(30) Foreign Application Priority Data

Feb. 16, 2016 (JP) .................................. 2016-026498

(51) Int. Cl.
*H04N 5/232* (2006.01)
*G02B 21/36* (2006.01)
(Continued)

(52) U.S. Cl.
CPC ........... *H04N 5/23212* (2013.01); *G02B 7/38* (2013.01); *G02B 21/244* (2013.01);
(Continued)

(58) Field of Classification Search
CPC .............. H04N 5/23212; H04N 5/2256; G06T 2207/10148; G06T 2207/10056; G06T 7/0085; G06T 2207/10016
See application file for complete search history.

(56) References Cited

U.S. PATENT DOCUMENTS 5,647,025 A * 7/1997 Frost ......................... G02B 7/28
  250/201.3
8,817,040 B2 * 8/2014 Atkinson ............. A61B 5/0059
  345/600

(Continued)

FOREIGN PATENT DOCUMENTS

| EP | 1 873 232 A1 | 1/2008 | |
|---|---|---|---|
| EP | 1873232 A1 * | 1/2008 | ............ C12M 35/00 |
| JP | 2015-082096 A | 4/2015 | |

OTHER PUBLICATIONS

"Analysis of focus measure operators for shapefrom-focus", Pattern Recognition, vol. 46, No. 5, May 1, 2013 (May 1, 2013), pp. 1415-1432, XP55173399, ISSN: 0031-3203, DOI: 10.1016/j.patcog.2012.11.011.*

(Continued)

*Primary Examiner* — Tsion B Owens
(74) *Attorney, Agent, or Firm* — McDermott Will & Emery LLP

(57) ABSTRACT

A cell observation apparatus includes an imaging device capable of imaging a vessel containing cells while varying a focal position, an illuminating device for irradiating the vessel with illuminating light; and a controller for controlling the imaging device. The controller includes: a z-stack imaging controller for causing the imaging device to take a plurality of z-stack images while varying the focal position; a variance value calculation part for calculating a variance value of pixels values for each of the z-stack images; an edge index value calculation part for calculating an edge index value indicative of edge strength for each of the z-stack images; a focus evaluation value calculation part for calculating a focus evaluation value having a minimum value in an in-focus position, based on the variance value and the edge index value; and an in-focus position estimation part for calculating the focal position where the focus evaluation (Continued)

value has a minimum value to estimate the in-focus position. This achieves the estimation of the in-focus position with high precision while suppressing the increase in the number of images taken for z-stack imaging.

13 Claims, 12 Drawing Sheets

(51) Int. Cl.
 G02B 7/38 (2006.01)
 G06K 9/00 (2006.01)
 H04N 5/225 (2006.01)
 G06T 7/00 (2017.01)
 G02B 21/24 (2006.01)
 G06T 7/13 (2017.01)

(52) U.S. Cl.
 CPC ....... G02B 21/367 (2013.01); G06K 9/00134 (2013.01); G06T 7/0085 (2013.01); G06T 7/13 (2017.01); G06T 7/97 (2017.01); H04N 5/2256 (2013.01); G06T 2207/10016 (2013.01); G06T 2207/10056 (2013.01); G06T 2207/10148 (2013.01); G06T 2207/30024 (2013.01)

(56) References Cited

U.S. PATENT DOCUMENTS

| | | | | |
|---|---|---|---|---|
| 9,404,737 B2* | 8/2016 | Segale | ............... | G01N 21/6458 |
| 9,767,425 B2* | 9/2017 | Chirica | ............... | G06Q 10/0633 |
| 2010/0328434 A1* | 12/2010 | Kiyota | ............... | C12M 41/14 348/46 |
| 2012/0249770 A1* | 10/2012 | Hamm | ............... | G02B 21/244 348/79 |

OTHER PUBLICATIONS

Said Pertuz et al., "Analysis of focus measure operators for shape-from-focus", Pattern Recognition, vol. 46, No. 5, pp. 1415-1432 (2013).

Extended European Search Report issued in corresponding European Patent Application No. 16186341.0, dated Jun. 19, 2017.

* cited by examiner

APPARATUS FOR AND METHOD OF OBSERVING CELLS

BACKGROUND OF THE INVENTION

Field of the Invention

The present invention relates to an apparatus for and a method of observing cells.

Description of the Background Art

For observation of cells cultivated in a culture vessel, it is necessary to find a focal position suitable for the observation of the cells. It has been hitherto known to perform what is called "z-stack imaging" or "bracketing imaging" that is a technique of acquiring a plurality of images using varied focal positions for the purpose of detecting an in-focus position for the cells in the culture vessel. The z-stack imaging is disclosed, for example, in Japanese Patent Application Laid-Open No. 2015-82096 (paragraph 0019).

The in-focus position is estimated, for example, by determining the variance value of pixel values of z-stack images. Unfortunately, the variance value changes rapidly near the in-focus position. For accurate estimation of the in-focus position, it is necessary to shorten imaging intervals. That is, the greater the number of z-stack images is, the more accurately the in-focus position is estimated. However, the greater number of images taken for z-stack imaging causes illuminating light to do greater damage to the cells because the cells are irradiated with the illuminating light during the imaging. For suitable observation of the cells with minimum damage to the cells, it is necessary to accurately estimate the in-focus position with high precision from a smaller number of images taken for z-stack imaging.

SUMMARY OF THE INVENTION

It is therefore an object of the present invention to provide a technique for estimating an in-focus position with high precision while reducing the number of images taken for z-stack imaging.

A first aspect of the present invention is intended for a cell observation apparatus for observing two-dimensionally cultivated cells. The cell observation apparatus comprises: an imaging device capable of imaging a vessel containing the cells while varying a focal position; an illuminating device for irradiating the vessel with illuminating light; and a controller for controlling the imaging device, the controller including a z-stack imaging controller for causing the imaging device to take a plurality of z-stack images while varying the focal position, a variance value calculation part for calculating a variance value of pixels values for each of the z-stack images, an edge index value calculation part for calculating an edge index value indicative of edge strength for each of the z-stack images, a focus evaluation value calculation part for calculating a focus evaluation value having a minimum value in an in-focus position for each of the z-stack images, based on the variance value and the edge index value, and an in-focus position estimation part for calculating the focal position where the focus evaluation value has a minimum value to estimate the in-focus position, based on the focus evaluation value for each of the z-stack images.

A second aspect of the present invention is intended for a method of observing two-dimensionally cultivated cells. The method comprises the steps of: a) taking a plurality of z-stack images while varying a focal position; b) calculating a variance value of pixels values for each of the z-stack images; c) calculating an edge index value indicative of edge strength for each of the z-stack images; d) calculating a focus evaluation value having a minimum value in an in-focus position for each of the z-stack images, based on the variance value and the edge index value; and e) calculating the focal position where the focus evaluation value has a minimum value to estimate the in-focus position, based on a relationship between the focal position and the focus evaluation value for each of the z-stack images.

According to the first and second aspects of the present invention, the in-focus position is estimated with high precision while the number of images for z-stack imaging is reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment according to the present invention will now be described with reference to the drawings.

<1. Configuration of Cell Observation Apparatus>

Figure 1:
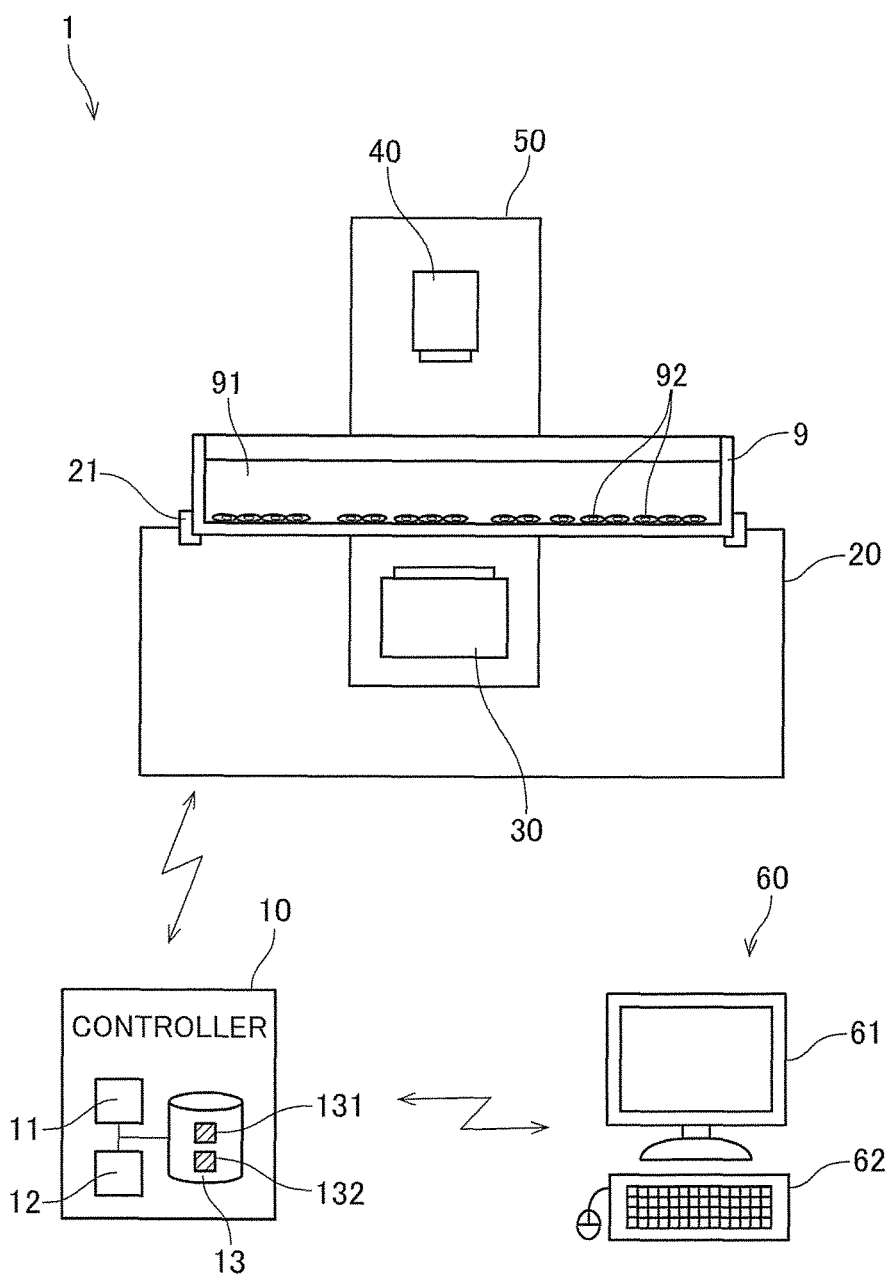
FIG. 1 is a schematic view of a cell observation apparatus.

FIG. 1 is a schematic view of a cell observation apparatus 1 according to one preferred embodiment of the present invention. The cell observation apparatus 1 according to this preferred embodiment is an apparatus for acquiring images of cells held in a culture vessel 9 placed on a vessel support 21. As shown in FIG. 1, the culture vessel 9 according to this preferred embodiment is a petri dish made of glass, resin and the like. The culture vessel 9 contains a culture solution 91 therein, and holds cells 92 to be observed in the culture solution 91.

The cells 92 are cultivated inside the culture vessel 9. Thus, the cells 92 are cultivated two-dimensionally along the bottom of the culture vessel 9.

As shown in FIG. 1, the cell observation apparatus 1 includes an apparatus body 20, an imaging device 30, an illuminating device 40, a moving mechanism 50, a manipulation part 60, and a controller 10.

The apparatus body 20 is an enclosure for supporting the imaging device 30 and the illuminating device 40. The imaging device 30 and the illuminating device 40 are supported horizontally movably with respect to the apparatus body 20. The apparatus body 20 includes the vessel support 21 supporting the culture vessel 9. The culture vessel 9 in a horizontal attitude with the bottom thereof downside is set on the vessel support 21.

The imaging device 30 is disposed under the vessel support 21. The imaging device 30 is capable of imaging the culture vessel 9 containing the cells 92 while varying a focal position. Specifically, the imaging device 30 takes images of the culture vessel 9 from below to thereby acquire image data about the culture vessel 9 including the cells 92. The imaging device 30 is implemented, for example, by a camera including an optical system such as a lens, and an imaging device such as CCD, CMOS and other imaging devices.

The illuminating device 40 is disposed over the vessel support 21. The illuminating device 40 directs white illuminating light downwardly from above onto the culture vessel 9 to be photographed. Thus, the cells 92 contained in the culture vessel 9 are irradiated with the illuminating light.

The illuminating device 40 may be any device that directs illuminating light onto the cells 92 in the culture vessel 9. Thus, the position of a light source for the illuminating device 40 is not limited to the position lying over the culture vessel 9. The light source for the illuminating device 40 may be disposed in a position deviated from over the culture vessel 9, and configured to direct illuminating light therefrom through an optical system such as a mirror onto the culture vessel 9.

In this preferred embodiment, the imaging device 30 is disposed under the culture vessel 9 and the illuminating device 40 is disposed over the culture vessel 9. The structure of the cell observation apparatus 1 according to the present invention is not limited to such a structure. The imaging device 30 may be disposed over the culture vessel 9, whereas the illuminating device 40 be disposed under the culture vessel 9. Alternatively, both the imaging device 30 and the illuminating device 40 may be disposed over the culture vessel 9 or be disposed under the culture vessel 9.

The moving mechanism 50 is a mechanism for moving the imaging device 30 and the illuminating device 40 horizontally with respect to the apparatus body 20. The moving mechanism 50 moves the imaging device 30 and the illuminating device 40 without changing the positions of the imaging device 30 and the illuminating device 40 relative to each other.

In the cell observation apparatus 1 according to this preferred embodiment, an imaging range provided by the imaging device 30 and a light irradiation range provided by the illuminating device 40 are smaller than the size of the culture vessel 9. For imaging of the entire culture vessel 9, it is hence necessary to take images a plurality of times while moving the imaging device 30 and the illuminating device 40 in a horizontal direction.

For acquisition of image data in a predetermined area of the culture vessel 9, the moving mechanism 50 initially places the imaging device 30 and the illuminating device 40 in a predetermined position. Thus, the imaging range of the imaging device 30 and the irradiation range of the illuminating device 40 are positioned so that a target area from which image data is to be acquired lies within the imaging range and the irradiation range. Then, the illuminating light is directed from the illuminating device 40 toward the culture vessel 9, and the imaging device 30 photographs the culture vessel 9. An image photographed in this process includes the cells 92 held along the bottom of the culture vessel 9.

For acquisition of image data about the entire bottom of the culture vessel 9, the moving mechanism 50 initially places the imaging device 30 and the illuminating device 40 in a predetermined initial position. Then, the irradiation with illuminating light by means of the illuminating device 40 and the photographing by means of the imaging device 30 are repeated while the moving mechanism 50 repeatedly moves the imaging device 30 and the illuminating device 40, whereby the entire bottom of the culture vessel 9 is photographed while being scanned.

The manipulation part 60 includes a display part 61 and an input part 62. Image data about the culture vessel 9 which is inputted from the controller 10 is displayed on the display part 61. A liquid crystal display, for example, is used for the display part 61. An operator may input commands from the input part 62 to the controller 10. A keyboard and a mouse, for example, are used for the input part 62.

The controller 10 is a section for controlling the operations of the components in the cell observation apparatus 1. As schematically shown in FIG. 1, the controller 10 according to this preferred embodiment includes a computer having an arithmetic processor 11 such as a CPU, a memory 12 such as a RAM, and a storage part 13 such as a hard disk drive.

Figure 2:
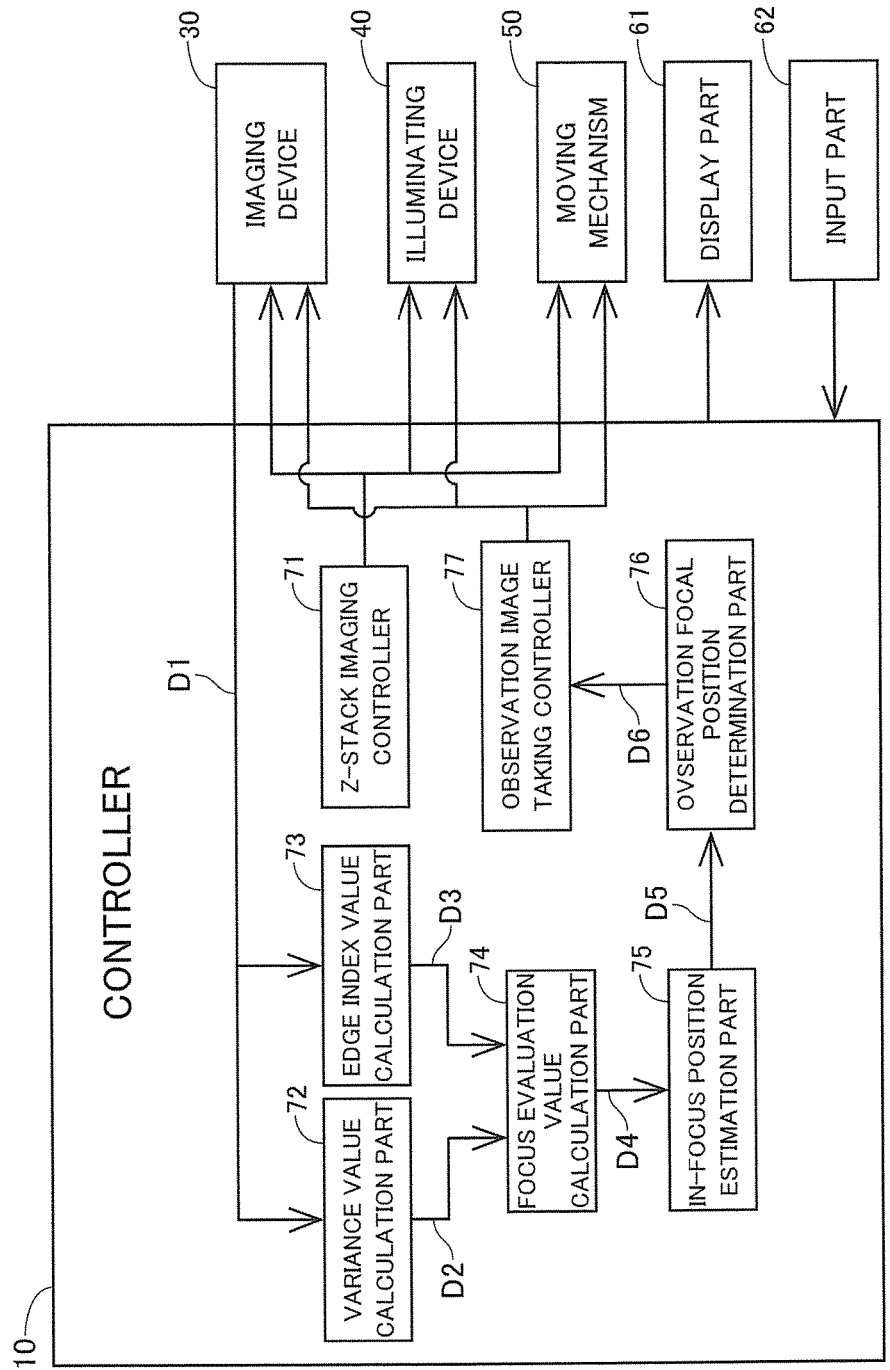
FIG. 2 is a block diagram showing a control system for the cell observation apparatus.

FIG. 2 is a block diagram showing a control system for the cell observation apparatus 1. As shown in FIG. 2, the controller 10 is electrically connected to the imaging device 30, the illuminating device 40, the moving mechanism 50, the display part 61 and the input part 62.

The controller 10 temporarily reads a computer program 131 and data 132 that are stored in the storage part 13 onto the memory 12, and the arithmetic processor 11 performs arithmetic processing based on the computer program 131 and the data 132, so that the controller 10 controls the operations of the components in the cell observation apparatus 1. Thus, a cell observation process in the cell observation apparatus 1 proceeds. It should be noted that the controller 10 may be formed by electronic circuitry.

As shown in FIG. 2, the controller 10 includes a z-stack imaging controller 71, a variance value calculation part 72, an edge index value calculation part 73, a focus evaluation value calculation part 74, an in-focus position estimation part 75, an observation focal position determination part 76 and an observation image taking controller 77, all of which are processing parts implemented in the form of software.

The z-stack imaging controller 71 causes the imaging device 30 to take a plurality of images while varying the focal position. That is, the z-stack imaging controller 71 causes the imaging device 30 to perform z-stack imaging. The plurality of images acquired by the z-stack imaging are referred to hereinafter as z-stack images D1.

The variance value calculation part 72 calculates a variance value D2 of pixels values for each of the z-stack images D1. The edge index value calculation part 73 calculates an edge index value D3 indicative of edge strength for each of the z-stack images D1. The details of the edge index value D3 will be described later.

The focus evaluation value calculation part 74 calculates a focus evaluation value D4 for each of the z-stack images D1, based on the variance value D2 calculated by the variance value calculation part 72 and the edge index value D3 calculated by the edge index value calculation part 73. The details of the focus evaluation value D4 will be described later.

The in-focus position estimation part 75 estimates an in-focus position to calculate an estimated in-focus position D5, based on the focus evaluation value D4 for each of the z-stack images D1. The estimated in-focus position D5 shall be a focal position where the focus evaluation value D4 has a minimum value.

The observation focal position determination part 76 determines an observation focal position D6 that is the focal position for taking of an observation image, based on the estimated in-focus position D5. The observation image taking controller 77 causes the imaging device 30 to take an image of the cells 92 in the culture vessel 9, with the observation focal position D6 used as the focal position.

<2. Cell Observation Process>

Figure 3:
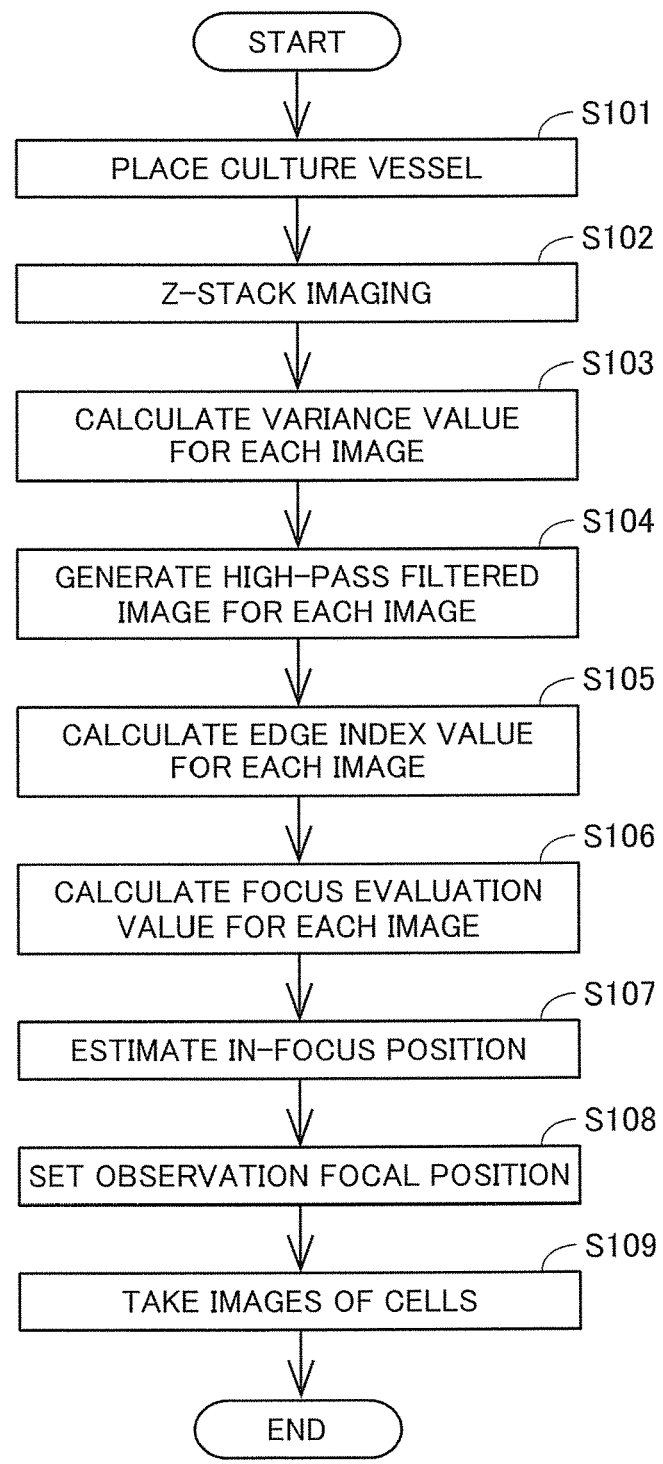
FIG. 3 is a flow diagram showing a procedure for a cell observation process in the cell observation apparatus.

Next, the cell observation process in the cell observation apparatus 1 will be described with reference to FIG. 3. FIG. 3 is a flow diagram showing a procedure for the cell observation process according to this preferred embodiment.

In the cell observation process, the culture vessel 9 is initially placed on the vessel support 21 (Step S101). In this step, an operator may manually place the culture vessel 9 on the vessel support 21. Alternatively, the cell observation apparatus 1 may include a moving mechanism for automatically placing the culture vessel 9 on the vessel support 21.

Figure 4:
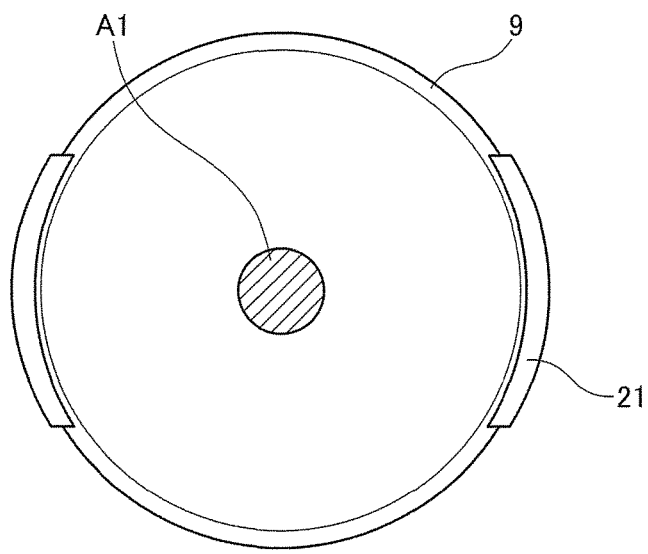
FIG. 4 is a view showing an imaging range for z-stack imaging.

Next, the z-stack imaging controller 71 causes the imaging device 30 to perform the z-stack imaging (Step S102). FIG. 4 is a view showing an imaging range A1 for the z-stack imaging. In FIG. 4, the culture vessel 9 held on the vessel support 21 is viewed from below. The cells 92 in the culture vessel 9 are not shown in FIG. 4. In this preferred embodiment, the imaging range A1 for the z-stack imaging is disposed substantially centrally of the culture vessel 9. The position of the imaging range A1 for the z-stack imaging is not limited to such a substantially central position of the culture vessel 9. Preferably, the imaging range A1 is set in a region where the cells 92 are present in large numbers.

For the z-stack imaging, the z-stack imaging controller 71 initially drives the moving mechanism 50 to place the imaging device 30 and the illuminating device 40 in an imaging position of the imaging range A1. Subsequently, the z-stack imaging controller 71 drives the illuminating device 40 and the imaging device 30 to acquire the plurality of z-stack images D1 while varying the focal position.

Figure 5:
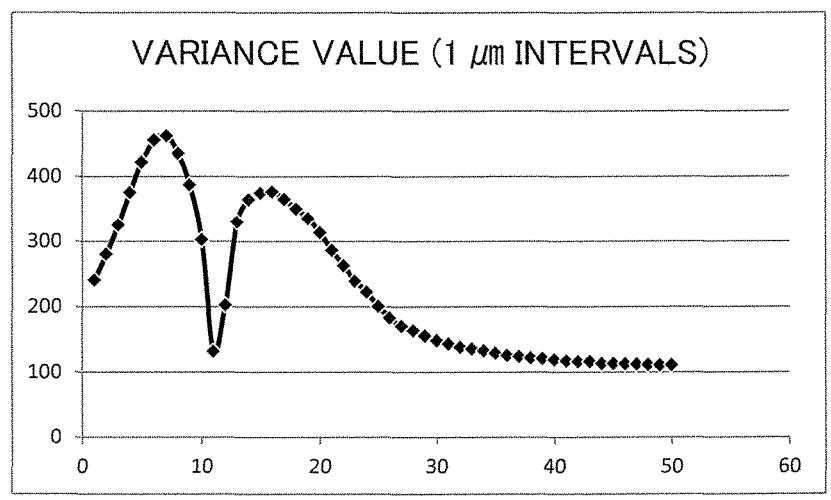
FIG. 5 is a graph showing an exemplary relationship between a focal position at intervals of 1 μm and a variance value.
Figure 6:
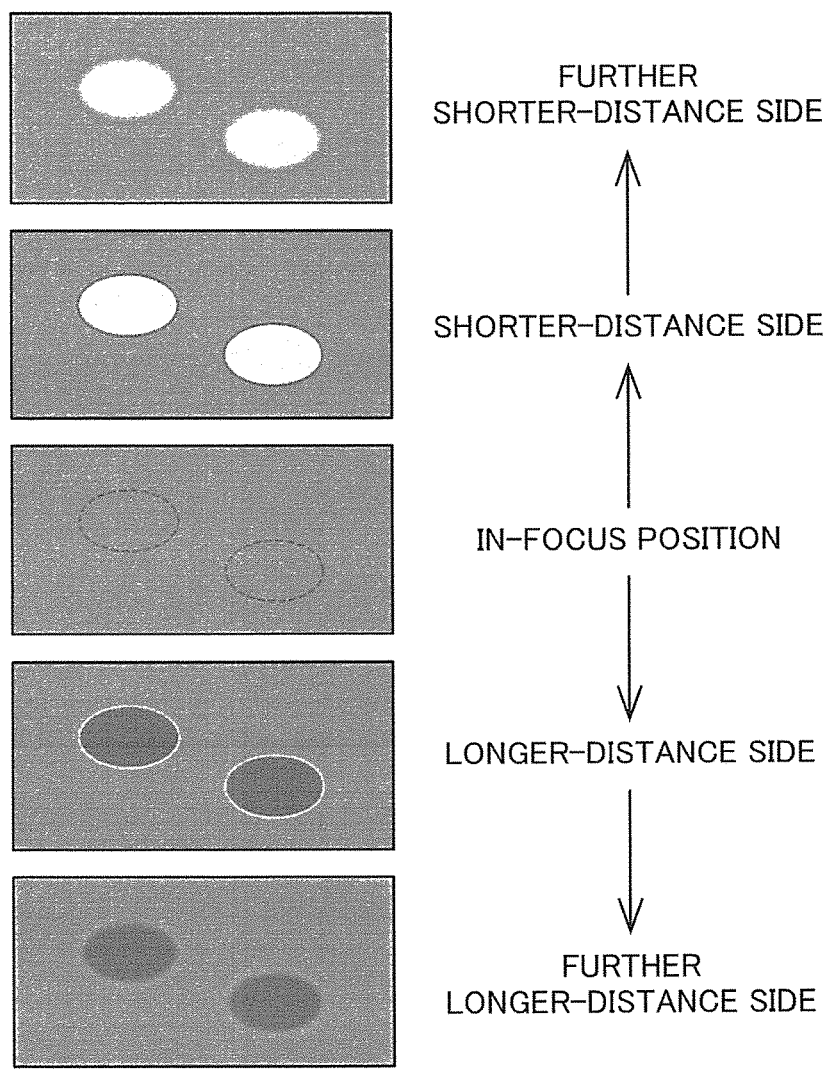
FIG. 6 is a schematic view of a relationship between a focal distance and how cells are seen.

Subsequently, the estimated in-focus position D5 is estimated for the imaging range A1 (Steps S102 to S107). First, the variance value calculation part 72 calculates the variance value D2 of pixels values for each of the z-stack images D1. FIG. 5 is a graph showing an exemplary relationship between the focal position (abscissa) and the variance value D2 (ordinate) in the case where the z-stack images D1 are acquired while the focal position is varied at intervals of 1 μm. FIG. 6 is a schematic view showing a relationship between a focal distance and how the cells are seen.

As shown in FIG. 5, the variance value D2 has two maximum values and one minimum value. The variance value D2 has the minimum value in the in-focus position, and has the maximum values in focal positions shifted a fixed distance apart from the in-focus position toward a shorter-distance side and toward a longer-distance side.

As schematically shown in FIG. 6, the brightness inside the cells and the brightness outside the cells are close to each other in the in-focus position because the cells are transparent. Thus, the variance value D2 for each of the z-stack images D1 is low and takes the minimum value. Also, the edge strength increases toward the in-focus position, but the edge strength becomes low in close proximity to the in-focus position. In the in-focus position, the cells are barely viewable.

As the focal position is shifted from the in-focus position toward the shorter-distance side, the inside of the cells looks whiter than the outside of the cells. The variance value D2 for each of the z-stack images D1 takes a maximum value in a position shifted a fixed distance from the in-focus position toward the shorter-distance side because of a large difference in brightness between the inside of the cells and the outside of the cells. As the focal position is further shifted toward the shorter-distance side, the image is blurred and the variance value D2 decreases gradually.

On the other hand, as the focal position is shifted from the in-focus position toward the longer-distance side, the inside of the cells looks blacker than the outside of the cells. The variance value D2 for each of the z-stack images D1 takes a maximum value in a position shifted a fixed distance from the in-focus position toward the longer-distance side because of a large difference in brightness between the inside of the cells and the outside of the cells. As the focal position is further shifted toward the longer-distance side, the image is blurred and the variance value D2 decreases gradually.

Thus, the in-focus position is estimated by acquiring the plurality of z-stack images D1 at short intervals and then determining the variance value D2 for each of the z-stack images D1. In the example of FIG. 5, the variance value D2 takes the minimum value at the focal position of 11 μm, and the variance value D2 at the focal position of 12 μm out of the two focal positions in front of and behind the focal position of 11 μm is closer to the minimum value than the variance value D2 at the focal position of 10 μm. It is hence estimated that the in-focus position is present in the focal position range from 11 μm to less than 12 μm.

In this manner, the in-focus position is estimated by performing fitting on the variance value D2 near the minimum value. However, the gradient of the variance value D2 is steep near the minimum value. For estimation of the in-focus position with high precision, it is hence necessary to acquire the plurality of z-stack images D1 at sufficiently short intervals. For acquisition of the z-stack images D1 at short intervals, the number of times that the z-stack images D1 are taken is increased. This increases damages to the cells 92 to be imaged, and also increases the amount of time for z-stack imaging. However, when the focal position intervals for the acquisition of the z-stack images D2 are increased, it is difficult to accurately estimate the focal position where the variance value D2 has the minimum value.

Figure 7:
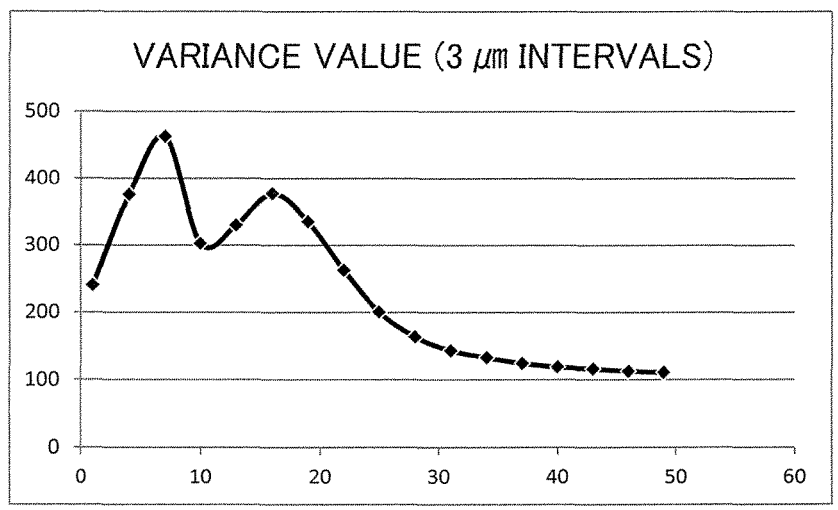
FIG. 7 is a graph showing an exemplary relationship between the focal position at intervals of 3 μm and the variance value.
Figure 8:
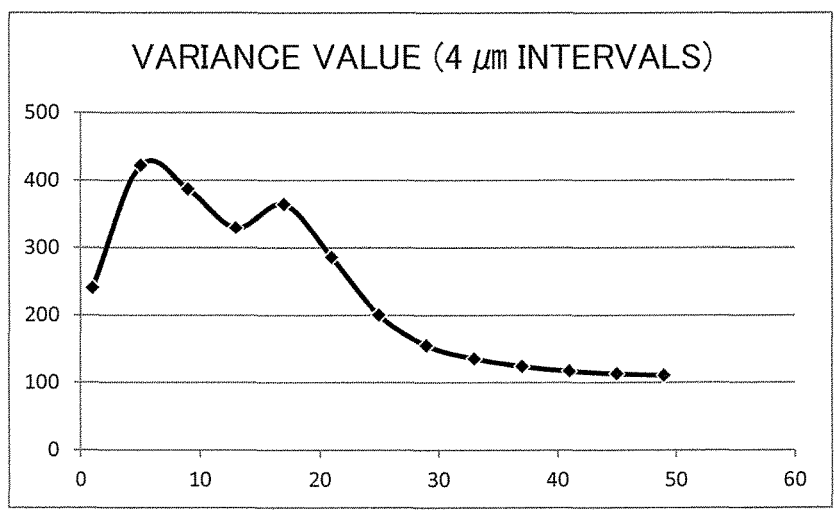
FIG. 8 is a graph showing an exemplary relationship between the focal position at intervals of 4 μm and the variance value.

FIG. 7 is a graph showing the variance value D2 for each of the z-stack images D1 in the example of FIG. 5 versus the focal position at intervals of 3 μm. FIG. 8 is a graph showing the variance value D2 for each of the z-stack images D1 in the example of FIG. 5 versus the focal position at intervals of 4 μm. As shown in FIGS. 7 and 8, when the intervals of the focal position during the acquisition of the z-stack images D1 are increased, it is difficult to grasp the position of the minimum value. This decreases the precision of estimation of the in-focus position. To avoid such a problem, the cell observation apparatus 1 uses the focus evaluation value D4 determined in Steps S104 to S106 to be described below to estimate the in-focus position, thereby calculating the estimated in-focus position D5.

After or at the same time that the variance value calculation part 72 calculates the variance value D2 for each of the z-stack images D1, the edge index value calculation part 73 calculates the edge index value D3 for each of the z-stack images D1 (Steps S104 and S105). A value indicative of the edge strength of each of the z-stack images D1 is used as the edge index value D3. That is, a value that increases with the increase in edge components of each of the z-stack images D1 is used as the edge index value D3. The edge index value D3 according to this preferred embodiment is a variance value of a high-pass filtered image obtained by performing a high-pass filtering process on each of the z-stack images D1.

For calculation of the edge index value D3, the edge index value calculation part 73 initially generates the high-pass filtered image by performing the high-pass filtering process on each of the z-stack images D1. The edge index value calculation part 73 according to this preferred embodiment performs the high-pass filtering process by performing a Gaussian filtering process on each of the z-stack images D1 to acquire a low-pass filtered image and then squaring the difference between the pixel values of each unprocessed z-stack image D1 and an image subjected to the Gaussian filtering process. That is, the edge index value calculation part 73 makes a comparison between pixel values of an original image and pixel values of the low-pass filtered image for each of the z-stack images to generate the high-pass filtered image.

The high-pass filtering process is not limited to the aforementioned process. For example, the edge index value calculation part 73 may perform the high-pass filtering process by performing a fast Fourier transform (FFT) on each of the z-stack images D1, removing low frequency components from each of the z-stack images D1 subjected to the FFT, and then performing an inverse FFT (IFFT) on each of the z-stack images D1 subjected to the low frequency component removal.

Figure 9:
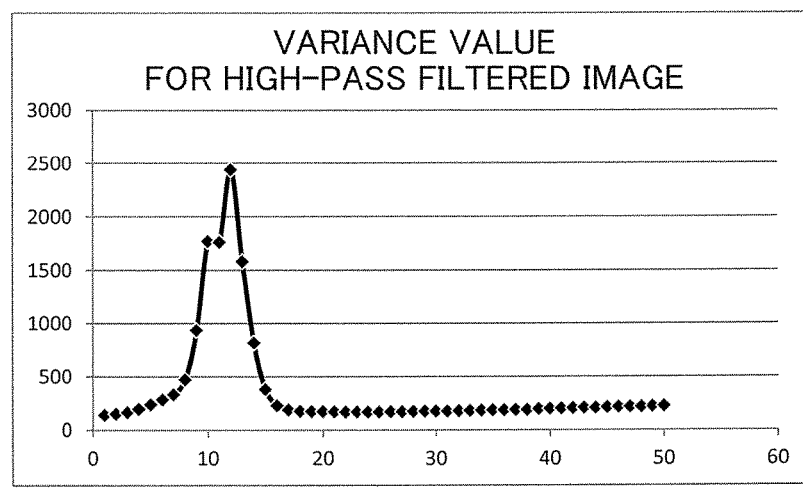
FIG. 9 is a graph showing an exemplary relationship between the focal position and the variance value of pixel values of a high-pass filtered image for a z-stack image.

Subsequently, the edge index value calculation part 73 calculates the edge index value D3 that is the variance value of the pixel values in each high-pass filtered image (Step S105). FIG. 9 is a graph showing a relationship between the focal position (abscissa) and the edge index value D3 (ordinate) for each of the z-stack images D1 in the example of FIG. 5. As mentioned above, the edge strength increases toward the in-focus position, and becomes low in close proximity to the in-focus position. Accordingly, the edge index value D3 increases toward the in-focus position, and becomes low in close proximity to the in-focus position.

After the completion of the calculation of the variance value D2 by means of the variance value calculation part 72 (Step S103) and the calculation of the edge index value D3 by means of the edge index value calculation part 73 (Steps S104 and S105), the focus evaluation value calculation part 74 subsequently calculates the focus evaluation value D4 (Step S106).

Figure 10:
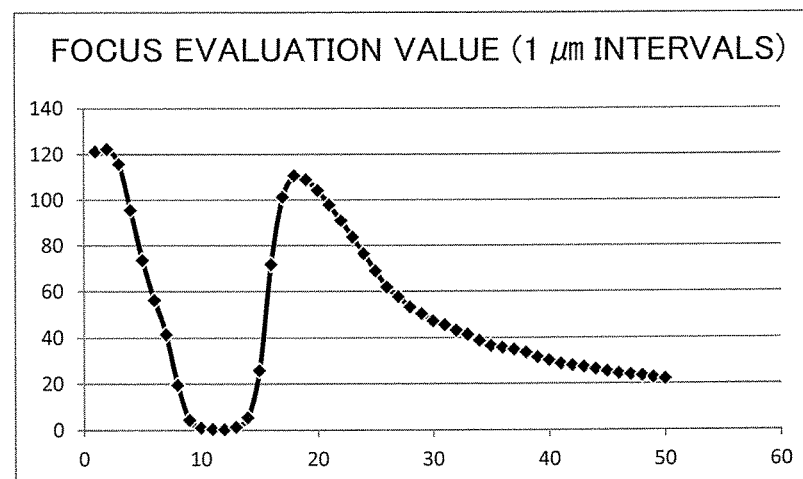
FIG. 10 is a graph showing an exemplary relationship between the focal position at intervals of 1 μm and a focus evaluation value.

The focus evaluation value D4 according to this preferred embodiment is obtained by dividing the variance value D2 by the square of the edge index value D3. That is, the focus evaluation value D4 is expressed by (focus evaluation value $D4$)=(variance value $D2$)/(edge index value $D3$)$^2$ FIG. 10 is a graph showing a relationship between the focal position and the focus evaluation value D4 for each of the z-stack images D1 in the example of FIG. 5. The focus evaluation value D4 takes a minimum value in the in-focus position because the variance value D2 takes the minimum value in the in-focus position and the edge index value D3 takes a relatively large value near the in-focus position. Thus, the estimated in-focus position D5 is calculated by estimating the focal position where the focus evaluation value D4 takes the minimum value.

Figure 11:
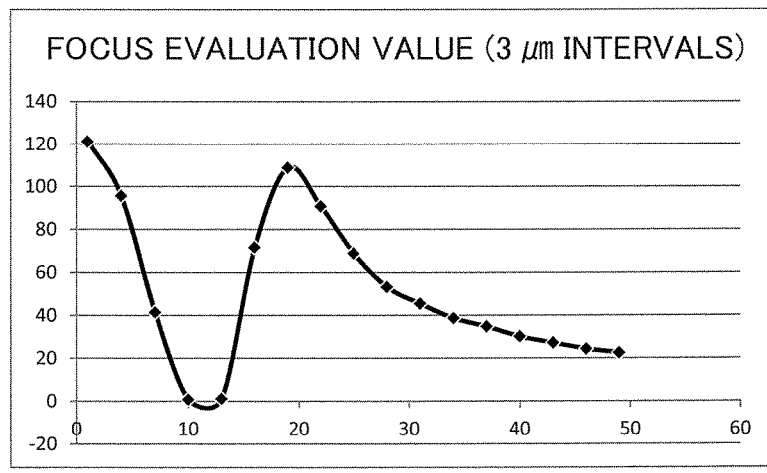
FIG. 11 is a graph showing an exemplary relationship between the focal position at intervals of 3 μm and the focus evaluation value.
Figure 12:
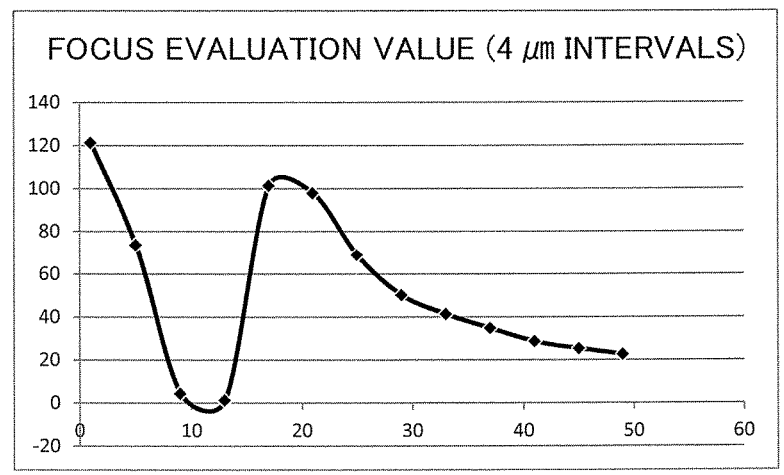
FIG. 12 is a graph showing an exemplary relationship between the focal position at intervals of 4 μm and the focus evaluation value.

FIG. 11 is a graph showing the focus evaluation value D4 shown in FIG. 10 versus the focal position at intervals of 3 μm. FIG. 12 is a graph showing the focus evaluation value D4 shown in FIG. 10 versus the focal position at intervals of 4 μm.

As shown in FIGS. 5, 7 and 8, the graphs of the variance value D2 having a steep gradient near the minimum value show that significantly different curves are plotted by increasing the focal position intervals. However, as shown in FIG. 10, the focus evaluation value D4 has a gentle gradient near the minimum value, as compared with the variance value D2 shown in FIG. 5. Accordingly, as shown in FIGS. 10 to 12, the graphs of the focus evaluation value D4 show that plotted curves are changed in shape less significantly than those of the variance value D2 when the focal position intervals are increased. Thus, the estimation of the focal position where the focus evaluation value D4 takes the minimum value as the in-focus position achieves the calculation of the estimated in-focus position D5 with higher precision than the estimation of the focal position where the variance value D2 takes the minimum value as the in-focus position.

After the calculation of the focus evaluation value D4 in Step S106, the in-focus position estimation part 75 calculates the estimated in-focus position D5 where the focus evaluation value D4 has the minimum value to estimate the in-focus position (Step S107). Specifically, the in-focus position estimation part 75 performs parabola fitting on three focus evaluation values D4, i.e. the focus evaluation value D4 taking the minimum value and two focus evaluation values D4 in relation to its adjacent focal positions, out of the plurality of focus evaluation values D4 corresponding to the respective z-stack images D1. That is, the in-focus position estimation part 75 performs quadratic function approximation on a relationship between the focal position and the three focus evaluation values D4. Then, the in-focus position estimation part 75 calculates the focal position where the approximate quadratic function takes the minimum value as the estimated in-focus position D5.

The parabola fitting is used for the calculation of the estimated in-focus position D5 in this preferred embodiment. The present invention, however, is not limited to this. The in-focus position estimation part 75 may calculates the estimated in-focus position D5 through the use of equiangular line fitting or other function approximation methods. When the focal intervals of the z-stack images D1 are sufficiently small, the focal position where the focus evaluation value D4 takes the minimum value out of the plurality of focus evaluation values D4 may be used directly as the estimated in-focus position D5.

After the calculation of the estimated in-focus position D5, the observation focal position determination part 76 sets the observation focal position D6 that is the focal position during the taking of the observation image (Step S108). Information about the type of the cells 92 to be observed, an observation condition desired by a user and the like is previously inputted from the input part 62 to the controller 10. A data table containing descriptions on an appropriate shift length from the in-focus position during observation on the shorter-distance side and an appropriate shift length from the in-focus position during observation on the longer-distance side for each type of the cells is previously stored in the storage part 13 of the controller 10.

When the observation condition desired by the user is the in-focus position, the observation focal position determination part 76 sets the estimated in-focus position D5 as the observation focal position D6. When the observation condition desired by the user is the shorter-distance side, the observation focal position determination part 76 refers to the data table for a corresponding appropriate shift length on the shorter-distance side to set the position shifted the appropriate shift length from the estimated in-focus position D5 toward the shorter-distance side as the observation focal position D6. When the observation condition desired by the user is the longer-distance side, the observation focal position determination part 76 refers to the data table for a corresponding appropriate shift length on the longer-distance side to set the position shifted the appropriate shift length from the estimated in-focus position D5 toward the longer-distance side as the observation focal position D6. That is, when the observation condition desired by the user is the shorter-distance side or the longer-distance side, the cells 92 are imaged using the position shifted the predetermined distance from the estimated in-focus position D5 as the focal position in next Step S109.

Figure 13:
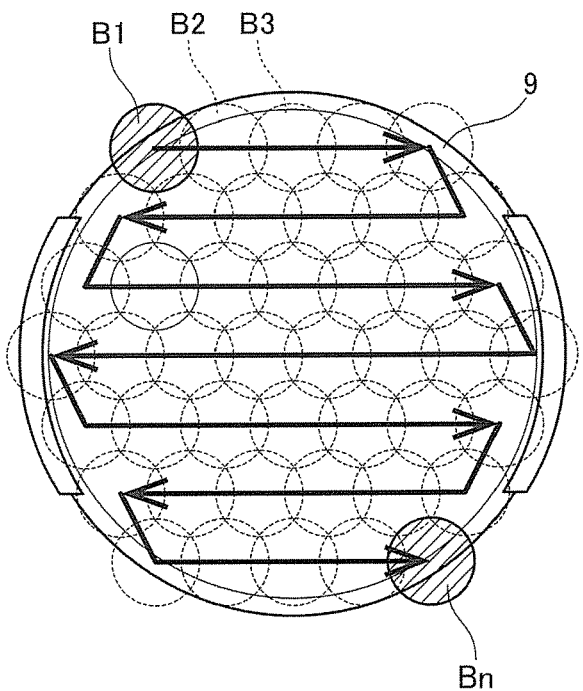
FIG. 13 is a view showing imaging ranges of observation images.

After the determination of the observation focal position D6, observation images of the cells 92 to be observed are taken (Step S109). FIG. 13 is a view showing imaging range B1 to Bn for taking of the observation images. In FIG. 13, the culture vessel 9 held on the vessel support 21 is viewed from below. The cells 92 in the culture vessel 9 are not shown in FIG. 13.

As shown in FIG. 13, the plurality of imaging ranges B1 to Bn are provided for the culture vessel 9 in this preferred embodiment. For taking of the observation images in the n imaging range B1 to Bn, the imaging device 30 and the illuminating device 40 move along the imaging ranges B1, B2, B3, . . . and Bn in the order named, as indicated by arrows in FIG. 13. That is, the movement of the imaging device 30 and the illuminating device 40 by means of the moving mechanism 50 and the imaging using the imaging device 30 and the illuminating device 40 are repeated. Thus, the plurality of observation images are taken. In this preferred embodiment, an imaging range in which an image is taken at a time is small as compared with the size of the culture vessel 9. Thus, the culture vessel 9 is divided into the plurality of imaging ranges B1 to Bn for the purpose of imaging.

In this manner, the focus evaluation values D4 are calculated from the plurality of z-stack images D1, and the in-focus position is estimated from the focus evaluation values D4. This achieves the estimation of the in-focus position with high precision while suppressing the increase in the number of taken z-stack images D1.

<3. Modifications>

While the one preferred embodiment according to the present invention has been described hereinabove, the present invention is not limited to the aforementioned preferred embodiment.

Figure 14:
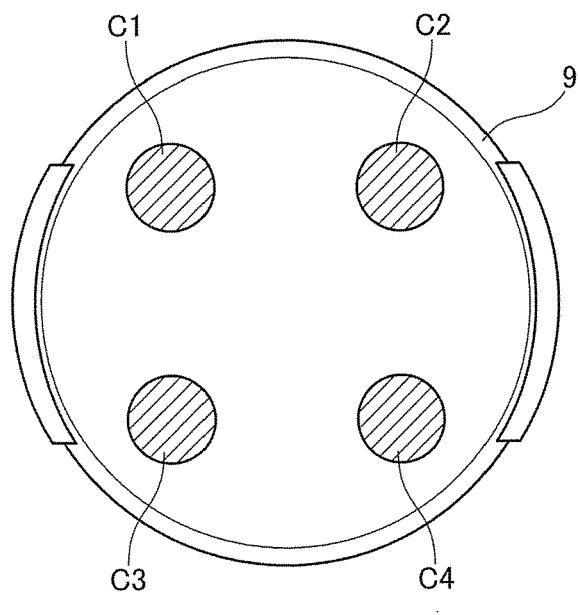
FIG. 14 is a view showing imaging ranges for z-stack imaging in the cell observation apparatus according to a modification of the present invention.

FIG. 14 is a view showing imaging ranges C1 to C4 for the z-stack imaging in the cell observation apparatus according to a modification of the present invention. In FIG. 14, the culture vessel 9 held on the vessel support 21 is viewed from below. The cells 92 in the culture vessel 9 are not shown in FIG. 14.

In the example shown in FIG. 14, the imaging ranges C1 to C4 for the z-stack imaging are substantially equidistant from the center of the culture vessel 9 and are substantially equally spaced apart from each other in a circumferential direction. In this manner, the z-stack imaging is performed in not less than three areas, and the estimated in-focus position D5 is calculated in each of the areas. This achieves the estimation of the in-focus position in each of the areas of the culture vessel 9 with higher precision. That is, the in-focus position in each of the areas of the imaging range B1 to Bn of the observation images is estimated with higher precision from the estimated in-focus positions D5 of the four imaging ranges C1 to C4.

In this manner, the number of imaging ranges for the z-stack imaging is not limited to one. At least three imaging ranges are preferably used when the z-stack imaging is performed in a plurality of areas. The z-stack imaging may be performed on each of the imaging ranges B1 to Bn of the observation images.

Figure 15:
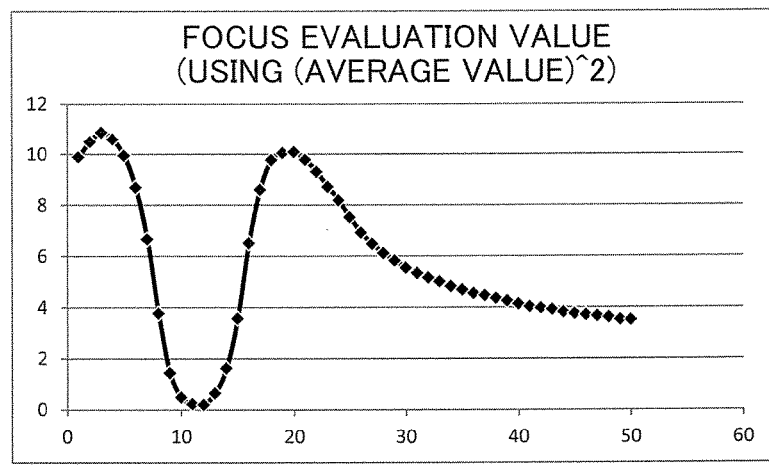
FIG. 15 is a graph showing an exemplary relationship between the focal position and the focus evaluation value in the cell observation apparatus according to a modification of the present invention.

FIG. 15 is a graph showing a relationship between the focal position and the focus evaluation value D4 determined by a calculation method according to a modification for each of the z-stack images D1 in the example of FIG. 5. For the focus evaluation value D4 in the example of FIG. 15, the average value of pixel values of the high-pass filtered image for each of the z-stack images D1 is used as the edge index value D3. The focus evaluation value D4 in the example of FIG. 15 is obtained by dividing the variance value D2 by the square of the edge index value D3 for each of the z-stack images D1, as in the aforementioned preferred embodiment.

Figure 16:
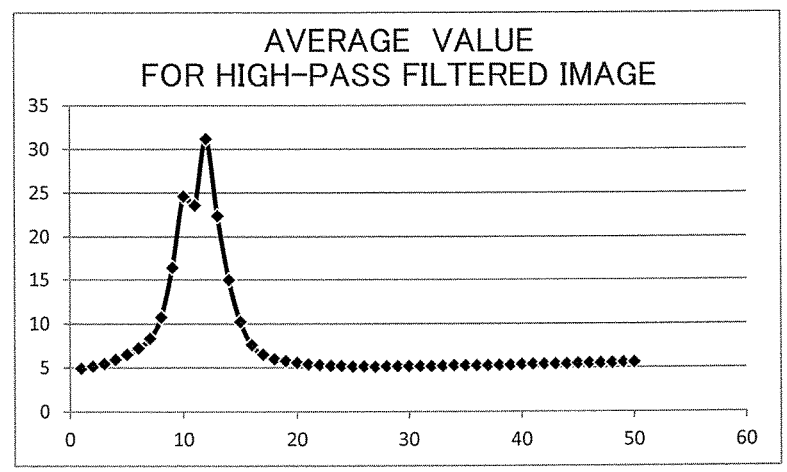
FIG. 16 is a graph showing an exemplary relationship between the focal position and the average value of pixel values of a high-pass filtered image in the cell observation apparatus according to a modification of the present invention.

FIG. 16 is a graph showing a relationship between the focal position and the average value of pixel values of the high-pass filtered image. Like the variance value of the pixel values of the high-pass filtered image, the average value of the pixel values of the high-pass filtered image is a value indicative of the edge strength. Specifically, the average value of the pixel values of the high-pass filtered image increases with the increase in edge components for each of the z-stack images D1. As mentioned above, edge strength increases toward the in-focus position, and becomes low in close proximity to the in-focus position. The average value of the pixel values of the high-pass filtered image increases toward the in-focus position, and becomes low in close proximity to the in-focus position. Thus, the average value of the pixel values of the high-pass filtered image may be used as the edge index value D3.

In the examples of FIGS. 15 and 16, the focus evaluation value D4 has a gentle gradient near the minimum value, as compared with the variance value D2 shown in FIG. 5. The estimation of the focal position where the focus evaluation value D4 takes the minimum value as the in-focus position achieves the calculation of the estimated in-focus position D5 with higher precision than the estimation of the focal position where the variance value D2 takes the minimum value as the in-focus position.

As in the examples of FIGS. 15 and 16, the average value of the pixel values of the high-pass filtered image for each of the z-stack images D1 may be used as the edge index value D3.

Figure 17:
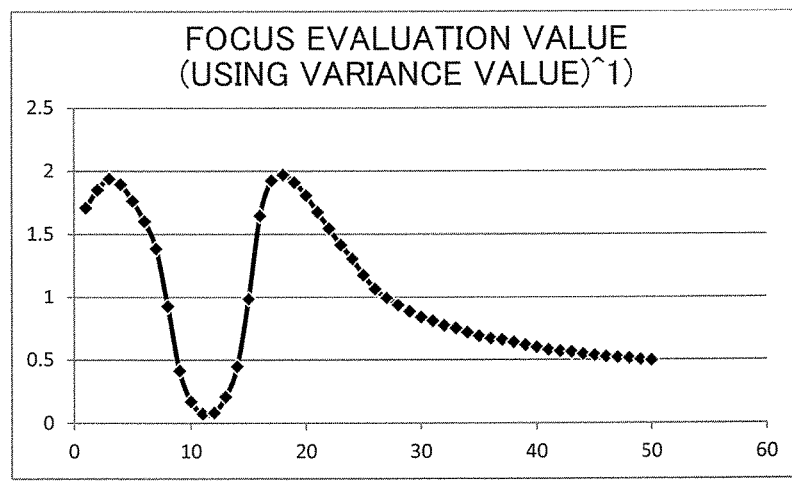
FIG. 17 is a graph showing an exemplary relationship between the focal position and the focus evaluation value in the cell observation apparatus according to a modification of the present invention.
Figure 18:
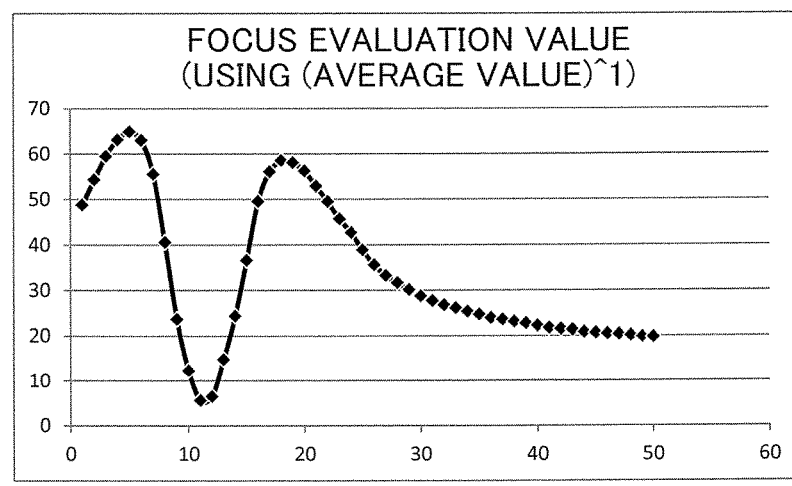
FIG. 18 is a graph showing an exemplary relationship between the focal position and the focus evaluation value in the cell observation apparatus according to a modification of the present invention.

FIGS. 17 and 18 are graphs each showing a relationship between the focal position and the focus evaluation value D4 determined by a calculation method according to a modification for each of the z-stack images D1 in the example of FIG. 5. The focus evaluation value D4 in each of the examples of FIGS. 17 and 18 is obtained by dividing the variance value D2 by the edge index value D3 raised to the power of one for each of the z-stack images D1. That is, the focus evaluation value D4 is expressed by $$(\text{focus evaluation value } D4) = (\text{variance value } D2)/(\text{edge index value } D3)$$

In the example of FIG. 17, the variance value of the pixel values of the high-pass filtered image is used as the edge index value D3. In the example of FIG. 18, the average value of the pixel values of the high-pass filtered image is used as the edge index value D3. In either of the examples of FIGS. 17 and 18, the focus evaluation value D4 has a gentle gradient near the minimum value, as compared with the variance value D2 shown in FIG. 5. Thus, the estimation of the focal position where the focus evaluation value D4 takes the minimum value as the in-focus position achieves the calculation of the estimated in-focus position D5 with higher precision than the estimation of the focal position where the variance value D2 takes the minimum value as the in-focus position.

As in the examples of FIGS. 17 and 18, the value obtained by dividing the variance value D2 by the edge index value D3 raised to the power of one may be used as the focus evaluation value D4. It is, however, more preferable that the value obtained by dividing the variance value D2 by the square of the edge index value D3 is used as the focus evaluation value D4 because of its gentler gradient near the minimum value. Also, the value obtained by dividing the variance value D2 by the edge index value D3 raised to the power of three or four may be used as the focus evaluation value D4.

Figure 19:
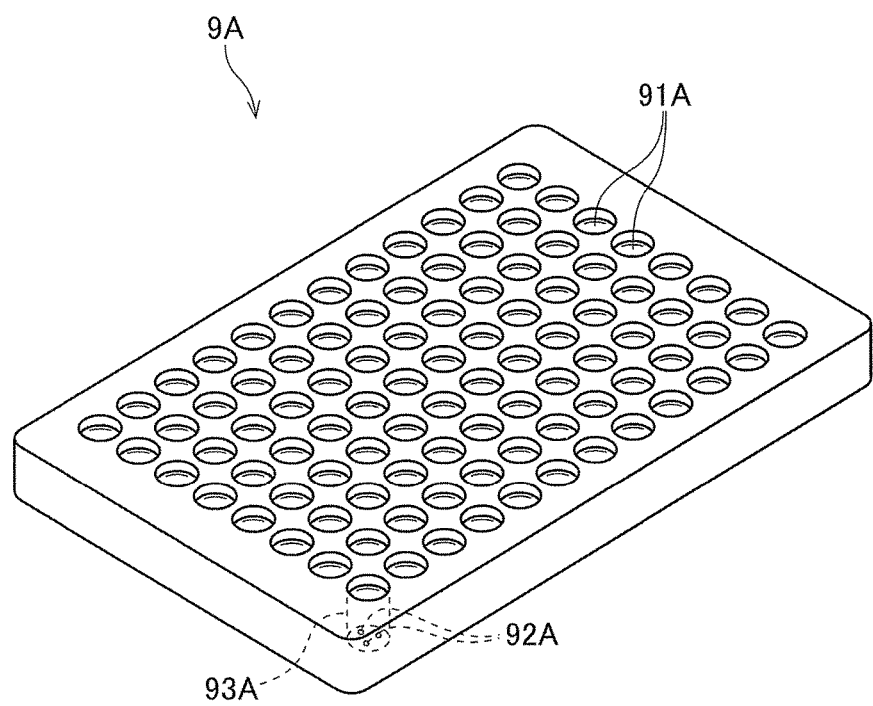
FIG. 19 is a perspective view of a cell culture vessel according to a modification of the present invention.

FIG. 19 is a perspective view of a culture vessel 9A according to a modification of the present invention. In the example of FIG. 19, the culture vessel 9A is a well plate having a plurality of depressions or wells 93A. The wells 93A are arranged regularly in a two-dimensional array. Each of the wells 93A has a light permeable bottom. Cells 92A to be observed are held with a culture solution 91A in each of the wells 93A.

A culture vessel configured such that a section for holding a culture solution and cells therein is divided into a plurality of regions as shown in FIG. 19 may be used as the culture vessel according to the present invention.

The components described in the aforementioned embodiment and in the various modifications may be consistently combined together, as appropriate.

While the invention has been described in detail, the foregoing description is in all aspects illustrative and not restrictive. It is understood that numerous other modifications and variations can be devised without departing from the scope of the invention.

What is claimed is:

1. A cell observation apparatus for observing two-dimensionally cultivated cells, comprising:
    an imaging device capable of imaging a vessel containing said cells while varying a focal position;
    an illuminating device for irradiating said vessel with illuminating light; and
    a controller for controlling said imaging device,
    said controller including
    a z-stack imaging controller for causing said imaging device to take a plurality of z-stack images while varying said focal position,
    a variance value calculation part for calculating a variance value of pixels values for each of said z-stack images,
    an edge index value calculation part for calculating an edge index value indicative of edge strength for each of said z-stack images,
    a focus evaluation value calculation part for calculating a focus evaluation value having a minimum value in an in-focus position for each of said z-stack images, by dividing said variance value by said edge index value raised to the power of one, two, three, or four, and
    an in-focus position estimation part for calculating said focal position where said focus evaluation value has a minimum value to estimate said in-focus position, based on said focus evaluation value for each of said z-stack images.

2. The cell observation apparatus according to claim 1, wherein
    said focus evaluation value calculation part calculates said focus evaluation value expressed by $$\text{focus evaluation value} = \text{variance value}/(\text{edge index value})^2.$$

3. The cell observation apparatus according to claim 1, wherein
    said edge index value calculation part generates a high-pass filtered image for each of said z-stack images to calculate said edge index value that increases with an increase in edge components, based on said high-pass filtered image.

4. The cell observation apparatus according to claim 3, wherein
    said edge index value calculation part uses a variance value of pixel values of said high-pass filtered image as said edge index value.

5. The cell observation apparatus according to claim 1, wherein
    said controller further includes
    an observation image taking controller for causing said imaging device to take an observation image of said cells, using a position shifted a predetermined distance from said in-focus position estimated by said in-focus position estimation part as the focal position.

6. A method of observing two-dimensionally cultivated cells, comprising the steps of:
    a) taking a plurality of z-stack images while varying a focal position;
    b) calculating a variance value of pixels values for each of said z-stack images;
    c) calculating an edge index value indicative of edge strength for each of said z-stack images;
    d) calculating a focus evaluation value having a minimum value in an in-focus position for each of said z-stack images, by dividing said variance value by said edge index value raised to the power of one, two, three, or four; and e) calculating said focal position where said focus evaluation value has a minimum value to estimate said in-focus position, based on a relationship between said focal position and said focus evaluation value for each of said z-stack images.

7. The method according to claim 6, wherein said focus evaluation value for each of said z-stack images is calculated in said step d) by focus evaluation value=variance value/(edge index value)$^2$.

8. The method according to claim 6, wherein said step c) includes the steps of:

c1) generating a high-pass filtered image for each of said z-stack images; and c2) calculating said edge index value that increases with an increase in edge components, based on said high-pass filtered image.

9. The method according to claim 8, wherein said edge index value is a variance value of pixel values of said high-pass filtered image.

10. The method according to claim 8, wherein said step c1) includes the steps of:

c11) performing a Gaussian filtering process on each of said z-stack images to acquire a low-pass filtered image; and c12) making a comparison between pixel values of an original image and pixel values of said low-pass filtered image for each of said z-stack images to generate said high-pass filtered image.

11. The method according to claim 8, wherein said step c1) includes the steps of:

c13) performing a Fourier transform on each of said z-stack images;

c14) removing low frequency components from each of said z-stack images subjected to the Fourier transform; and c15) performing an inverse Fourier transform on each of said z-stack images subjected to the Fourier transform and the low frequency component removal.

12. The method according to claim 6, wherein said focal position where said focus evaluation value has the minimum value is calculated in said step e) by performing parabola fitting on three focus evaluation values near said minimum value out of the plurality of focus evaluation values.

13. The method according to claim 6, further comprising the step of f) imaging said cells, using a position shifted a predetermined distance from said in-focus position estimated in said step e) as the focal position.

* * * * *